March 16, 1926.

W. A. STEPHEN

DENTAL FLASK

Filed July 30, 1924

1,576,556

Inventor:
William A. Stephen
By Wilson & McKenna
Attys.

Patented Mar. 16, 1926.

1,576,556

UNITED STATES PATENT OFFICE.

WILLIAM A. STEPHEN, OF ROCKFORD, ILLINOIS.

DENTAL FLASK.

Application filed July 30, 1924. Serial No. 729,018.

*To all whom it may concern:*

Be it known that I, WILLIAM A. STEPHEN, a citizen of the United States, residing at Rockford, in the county of Winnebago and State of Illinois, have invented certain new and useful Improvements in Dental Flasks, of which the following is a specification.

This invention relates in general to dentistry and has more particular reference to dental molds or flasks in which artificial teeth are set and a composition known as the denture is molded to provide a supporting body for the teeth, as is well known in this art. In practice, after the teeth have been set in the upper mold and the plastic rubber base composition filled in the mold the upper and lower mold bodies will be clamped together and subjected to heat as by immersion in hot water to vulcanize the rubber base composition. In order that this composition shall penetrate to every crevice in the mold and be subjected to compression for obtaining the desired density, it is necessary to place the mold under considerable compression and to increase such compression at progressive stages in the vulcanizing operation in order to insure the desired quality in the product. Molds heretofore in use for this purpose have been unsatisfactory for the reason that they have been comparatively short lived and become distorted under compression with the result that imperfect work is produced.

The primary purpose of the present invention is to provide an improved dental mold or flask so constructed that it will properly apply the compression forces to the mold and insure the production of a predetermined base or denture.

Another purpose is to so construct the mold that it will serve the desired purpose over a comparatively long period of time and, furthermore, will be capable of production at a comparatively low cost.

Referring to the accompanying drawing.

Figure 1:
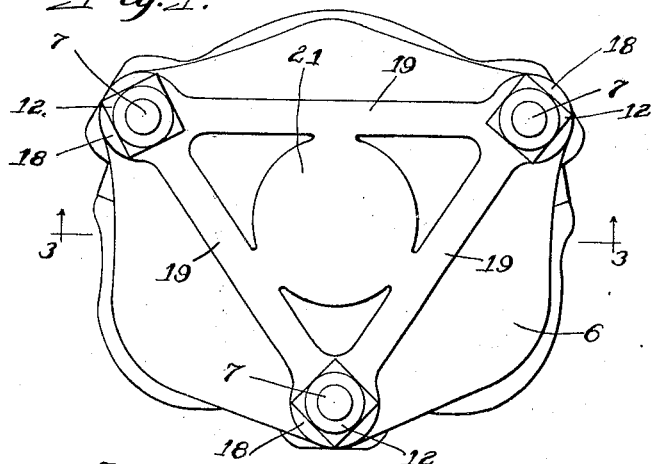
Figure 1, is a top view of a dental mold or flask embodying my invention.
Figure 2:
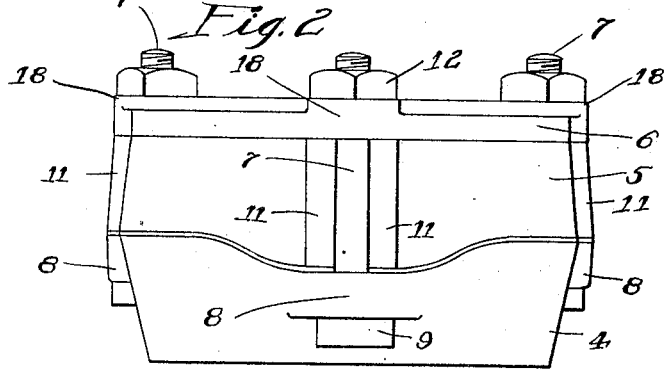
Fig. 2, is an end view of the flask.
Figure 3:
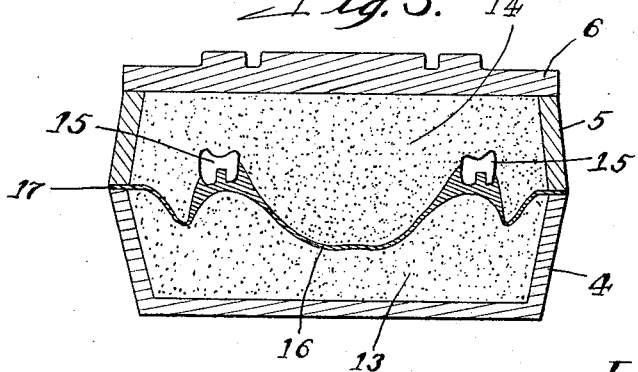
Fig. 3, is a section taken on the line 3—3 of Fig. 1.

The flask comprises the following principal elements, namely a lower and an upper mold body 4 and 5 respectively, a cover plate 6, and clamping bolts 7. The lower mold body has a bottom and side walls and the upper mold body has simply a side wall similar in shape to the side wall of the lower body. The particular configuration of the mold bodies is not essential to my invention. The lower mold body has a plurality, preferably three, of substantially equally spaced ears 8 integral therewith, through which ears the clamping bolts 7 pass and against the under side of which the heads 9 of said bolts will be drawn. The upper mold body has guide ribs 11 which partially embrace the bolts 7 and serve in part to properly locate and maintain the upper mold body in the desired relation to the lower mold body. The clamping bolts project up through the top plate 6 and are equipped with nuts 12 adapted to be drawn down onto the top plate for putting the mold under compression.

The lower and upper molds 13 and 14 respectively, usually of plaster Paris will be formed in the manner well known in this art and the artificial teeth 15 will be set in the upper mold substantially as shown. The plastic material forming the base or denture, usually a rubber composition, will be set into the mold as is the usual practice and will be vulcanized by immersing the entire mold in hot water. During the vulcanizing operation the mold will be compressed by a force in addition to that of the clamping bolts and at progressive intervals in the operation the mold will be removed, the nuts 12 tightened, and additional pressure applied. This operation is repeated until as practice has shown it is assured that the base composition has penetrated every crevice of the mold. During such operation the plastic base material will be forced out through the space 17 between the upper and lower mold bodies, this being excess material.

In order that the desired pressures might be applied to the mold without distortion of the several parts, or any of them, and in order to maintain the shape of the plaster cast or mold so that it will not be distorted by unequal distribution of the pressure I have constructed the cover plate in the following manner. At each clamping bolt I have provided a boss 18 against which the nut of the bolt clamps. These bolts are connected by upstanding ribs 19 providing trusses for carrying both tension and compression stresses accordingly as pressure is applied either by tightening the nut 12 or by applying pressure to the area bounded by the ribs. The greatest pressure is applied as by means of a screw clamp (not shown), the screw seat of which bears against a thrust pad 21 formed on the cover plate within the enclosure of the ribs 19. The bosses 18, ribs 19 and thrust pad 21 are cast integral with the cover plate and are of substantially uniform height. Inasmuch as the dental flask is cast of phosphor bronze the saving of material by constructing the cover plate in this manner is a very important factor from a commercial standpoint. By constructing the cover plate in the manner shown the tension and compression stresses are effectively carried and the objects above-mentioned are accomplished.

It is believed that the foregoing conveys a clear understanding of my invention and while I have illustrated but a single working embodiment it should be understood that changes might be made in details of construction without departing from the spirit and scope of the invention as expressed in the appended claim, in which—

I claim:

In a dental flask comprising a lower and upper hollow mold body, a cover plate arranged to be bolted to the lower mold body with the upper mold body clamped therebetween and aligned therewith, there being at least three bolts for fastening said cover plate, three heavy bosses at the edges of said plate arranged in substantially equally spaced relation and having openings to receive said bolts, reenforcing ribs of substantially the same height as said bosses on said plate extending directly between said bosses and forming a triangular-shaped integral truss for the plate, and a centrally located approximately circular thrust pad in the form of a boss inscribed within the figure formed by said ribs, said ribs and said pad being substantially of the same height to have the tops thereof flush with one another.

WILLIAM A. STEPHEN.